US012810344B2

(12) United States Patent
Maharaj et al.

(10) Patent No.: US 12,810,344 B2
(45) **Date of Patent: *Nov. 24, 2026**

(54) SHARING AND GENERATING PREPOPULATED CARTS BY AN ONLINE CONCIERGE SYSTEM

(71) Applicant: Maplebear Inc., San Francisco, CA (US)

(72) Inventors: Shaun Navin Maharaj, Vaughan (CA); Brent Scheibelhut, Toronto (CA); Bradley Colthurst, Toronto (CA); Ryan McColeman, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,089

(22) Filed: Jul. 8, 2025

(65) Prior Publication Data

US 2025/0335970 A1 Oct. 30, 2025

Related U.S. Application Data

(63) Continuation of application No. 18/070,382, filed on Nov. 28, 2022, now Pat. No. 12,373,879.

(51) Int. Cl.

| | |
|---|---|
| ***G06Q 30/00*** | (2023.01) |
| ***G06Q 10/087*** | (2023.01) |
| ***G06Q 30/0601*** | (2023.01) |

(52) U.S. Cl.
CPC ....... *G06Q 30/0633* (2013.01); *G06Q 10/087* (2013.01); *G06Q 30/0631* (2013.01)

(58) Field of Classification Search
CPC .................................................. G06Q 30/0633
See application file for complete search history.

(56) References Cited

U.S. PATENT DOCUMENTS

| | | | |
|---|---|---|---|
| 6,850,917 | B1 | 2/2005 | Hom et al. |
| 11,348,160 | B1 | 5/2022 | Shukla et al. |

(Continued)

OTHER PUBLICATIONS

Ariannezhad, Mozhdeh, et al. "A personalized neighborhood-based model for within-basket recommendation in grocery shopping." Proceedings of the Sixteenth ACM international conference on web search and data mining. 2023.*

(Continued)

*Primary Examiner* — Kathleen Palavecino
(74) *Attorney, Agent, or Firm* — Fenwick & West LLP

(57) ABSTRACT

An online concierge system facilitates ordering, procurement, and delivery of items to a customer from physical retailers based on shared cart recommendations. Based on customer identifying information and other data sources, the online concierge system may recommend prepopulated shared carts that may be of interest to a customer. The prepopulated carts may be associated with other users of the online concierge system or may be associated with specific events, locations, or other metadata. Prepopulated carts may be created by other users that select to share their carts. Additionally, prepopulated carts may be created and shared by retailers, manufacturers, wholesalers, or other stakeholders in the selling of items through the online concierge system. Furthermore, recommended carts may be automatically generated based on machine learning techniques.

20 Claims, 5 Drawing Sheets

(56) References Cited

U.S. PATENT DOCUMENTS

| | | | |
|---|---|---|---|
| 11,783,406 | B1 | 10/2023 | Hsiao et al. |
| 2016/0035005 | A1 | 2/2016 | Kumar et al. |
| 2016/0171578 | A1 | 6/2016 | Bawge et al. |

OTHER PUBLICATIONS

Non-Final Rejection Mailed on Sep. 26, 2024 for U.S. Appl. No. 18/070,382, 53 page(s).

* cited by examiner

SHARING AND GENERATING PREPOPULATED CARTS BY AN ONLINE CONCIERGE SYSTEM

CROSS REFERENCE TO RELATED APPLICATIONS

This application is a continuation of co-pending U.S. patent application Ser. No. 18/070,382, filed Nov. 28, 2022, which is incorporated by reference herein in its entirety.

BACKGROUND

An online concierge system receives selections of items from customers, assigns an order to a picker to procure the items from a physical retailer, and facilitates delivery of those items from the picker to the customer. In such a system, it is desirable to facilitate processes that assist the customer in efficiently selecting desirable items and placing orders. Such processes provide various technology-oriented benefits, such as relatively improved use of processing resources, network resources, or the like.

SUMMARY

In accordance with one or more aspects of the disclosure, an online concierge system facilitates ordering of items for procurement and delivery to a customer based on a shared cart recommendation. The online concierge system obtains customer identifying information for a customer of the online concierge system and determines, based on the customer identifying information, a shared cart for recommending to the customer. The shared cart includes a list of multiple items available for ordering from a retailer through the online concierge system for procurement and delivery to the customer. The online concierge system sends the shared cart to a customer client device associated with the customer for review by the customer and receives, from the customer client device, a selection of a control for ordering the shared cart. Responsive to receiving the selection, the online concierge system assigns the order to a picker for procurement and delivery of the order to the customer. The online concierge system then facilitates, via a picker client device, delivery of the one or more items in the order to the customer.

In an embodiment, the shared cart recommendation may be generated based on receiving a search query from the customer, performing a comparison of the search query to metadata associated with a set of shared carts in a shared cart repository, and selecting the shared cart for recommending to the customer based on the comparison.

In an embodiment, the shared cart recommendation may be generated based on receiving, from the customer, a request to subscribe to carts from a user of the online concierge system, and selecting the shared cart for recommending to the customer from the carts created by the user subscribed to by the customer.

In an embodiment, the shared cart recommendation may be generated based on obtaining a set of characteristics associated with the customer, and applying a machine learning model to the set of characteristics to identify the shared cart for recommending to the customer. The machine learning model may be trained based on historical interactions of customers with recommended shared carts.

In an embodiment, the shared cart recommendation may be generated based on determining a future event associated with the customer, and selecting the shared cart for recommending to the customer based on the future event. The future event may be derived from at least one of a calendar entry in an electronic calendar associated with the customer, a current location of the customer associated with the future event, a list of upcoming holidays relevant to the customer, and a list of events derived from a public data source.

In an embodiment, the shared cart recommendation may be generated based on selecting the shared cart from a shared cart repository that stores carts created by other customers of the online concierge system, retailers of the online concierge system, or manufacturers of items available through the online concierge system.

In an embodiment, the shared cart recommendation may be generated based on receiving the shared cart from another customer of the online concierge system that recommends the shared cart to the customer.

In an embodiment, the shared cart recommendation may be generated based on obtaining a set of characteristics associated with the customer, applying a machine learning model to the set of characteristics to identify a set of items for including in a shared cart for recommending to the customer, and automatically generating the shared cart based on the set of items identified from the machine learning model. The machine learning model may be trained based on historical interactions of customers with the online concierge system.

In an embodiment, sending the shared cart to the customer client device may comprise sending a notification to the customer client device with a link for accessing the shared cart.

In another embodiment, an online concierge system facilitates sharing of a shared cart created by a customer of the online concierge system. The online concierge system obtains, for a first customer client device, a selection of one or more items available from a retailer for adding to a shared cart created by a first customer. The online concierge system receives a selection to share the shared cart created by the first customer with at least a second customer of the online concierge system. Responsive to the selection, the online concierge system facilitates sharing of the shared cart with the second customer of the online concierge system by presenting the one or more items of the shared cart via a second customer client device. The online concierge system receives, from the second customer client device, a selection to order the shared cart. Responsive to receiving the selection, the online concierge system assigns the order to a picker for procurement and delivery of the order to the second customer. The online concierge system then facilitates, via a picker client device, delivery of the one or more items in the order to the second customer.

In an embodiment, facilitating sharing of the shared cart with the second customer comprises sending an electronic notification to the second customer client device including a reference to the shared cart, and causing the second customer client device to load the shared cart responsive to an interaction with the reference.

In an embodiment, facilitating sharing of the shared cart with the second customer comprises generating an embeddable link for posting to a social media platform that references the shared cart, and causing the second customer client device to load the shared cart responsive to an interaction with the embeddable link.

In an embodiment, obtaining the selection of the one or more items comprises obtaining the selection from a point-of-sale system at a physical retail location.

The above-described processes may be implemented at a computer system comprising a processor and a non-transitory computer-readable medium that stores instructions executable by a processor for performing the functions described herein.

DETAILED DESCRIPTION

Figure 1:
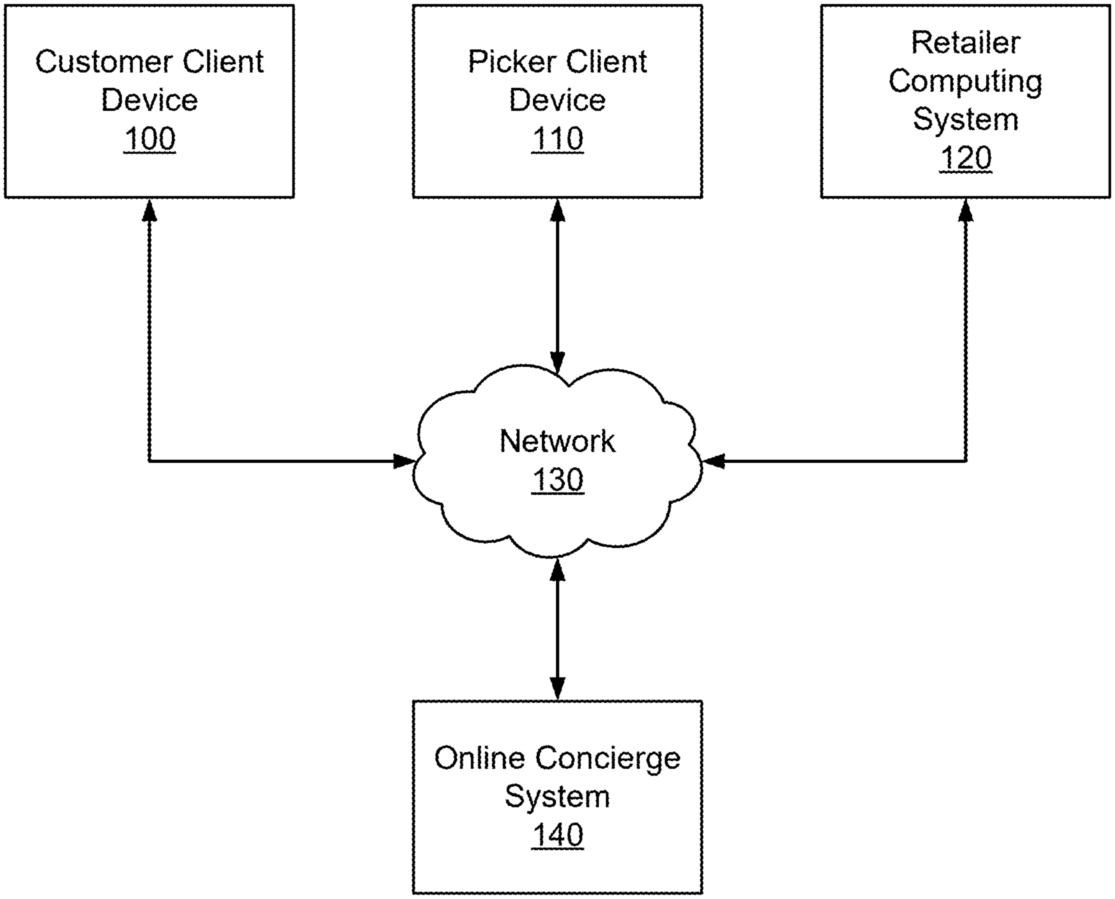
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a cart. A cart may comprise a tentative set of items (e.g., a shopping list) that have been selected but have not yet been ordered. The ordering interface allows a customer to update the cart, e.g., by changing the quantity of items, adding or removing items, or adding instructions for items that specify how the item should be collected. The interface furthermore enables the customer to share a created cart with other users or to select a prepopulated cart (without the user selecting each individual item) as will be described in further detail below.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi-or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

In an embodiment, the online concierge system 140 may facilitate various other interactions associated with a shopping experience. For example, the online concierge system 140 may enable sharing of carts between users, automatic generation of carts, selection of prepopulated carts, or other features that may improve and simplify the user experience. The online concierge system 140 is described in further detail below with regards to FIG. 2.

Figure 2:
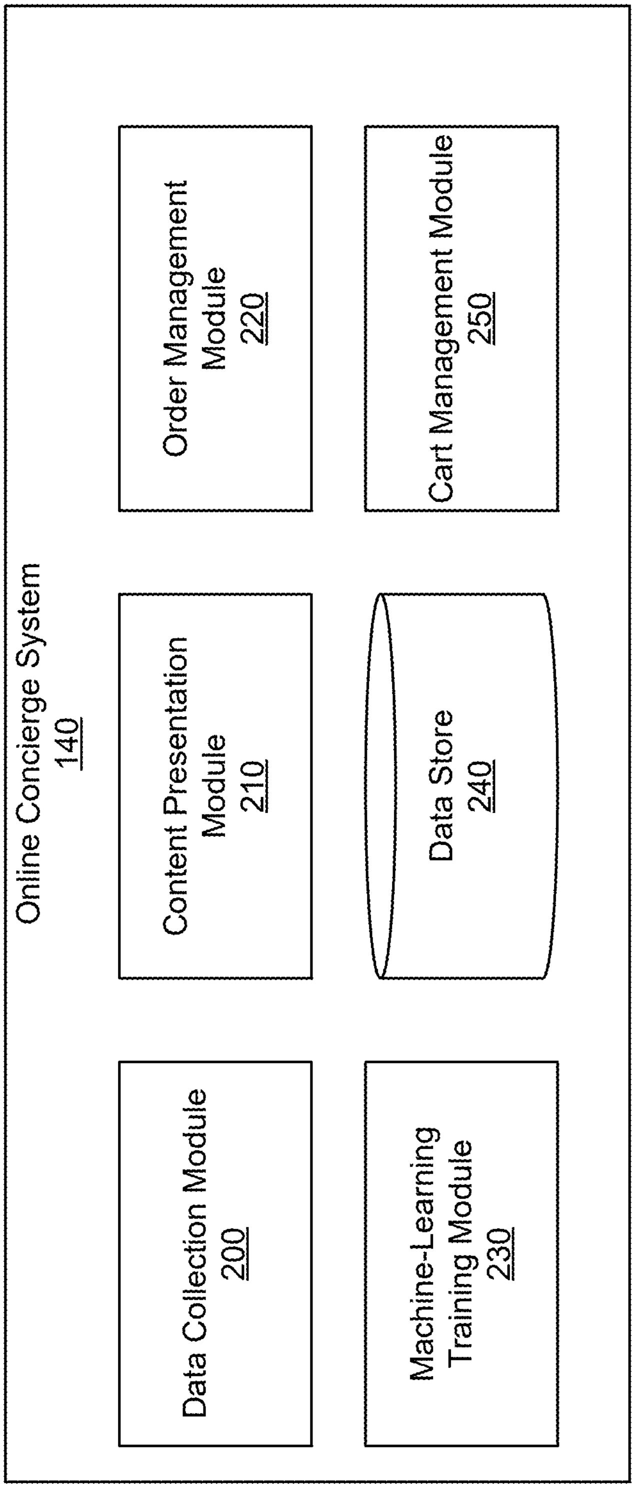
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data may further store connections between users in a social networking context. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 may furthermore present prepopulated carts that have been selected by the user or that are recommended to the user, as will be described in further detail below.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The cart management module 250 manages creation, editing, and sharing of carts. Generally, the cart management module 250 enables users to create carts and select to share carts with other users. Carts may be shared either directly by sending a link to the cart to another user, or indirectly by adding the shared carts to a searchable repository or adding a link to the cart to a social media post, a website, or other accessible location. Users may access shared carts to automatically populate items from the shared cart into an order all at once without the customer selecting each individual item in the cart. The cart management module 250 may furthermore automatically generate carts targeted to specific users, groups of users, or the general public. The cart management module 250 may automatically generate recommendations for carts that are created by other users or automatically generated. For example, the cart management module 250 may recommend carts in response to a search query, in response to subscription requests from users, based on promotion activity from retailers, wholesalers, or manufacturers, or automatically based on detected user characteristics and histories of interactions with the online concierge system. An example embodiment of a cart management module 250 is described in further detail in FIG. 3 below.

Figure 3:
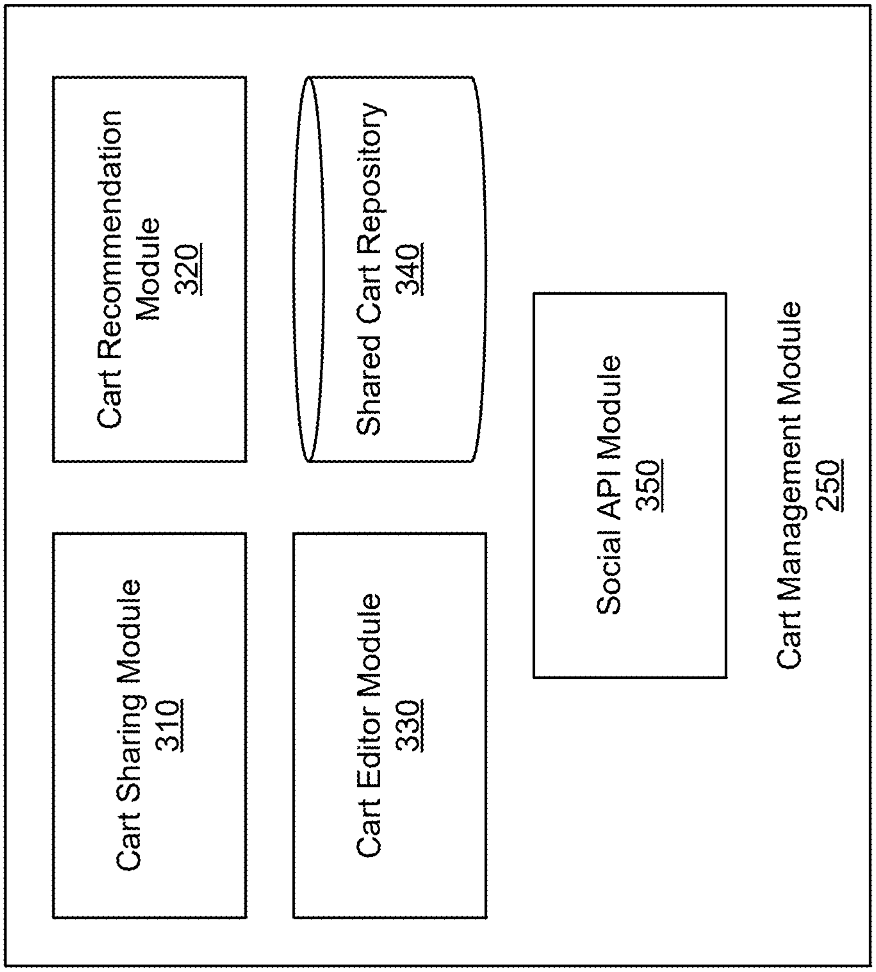
FIG. 3 is a block diagram illustrating an example embodiment of a cart management module for managing shared carts in an online concierge system.

FIG. 3 is a block diagram illustrating an example embodiment of a cart management module 250. In this embodiment, the cart management module 250 comprises a cart sharing module 310, a cart recommendation module 320, a cart editor module 330, a shared cart repository 340, and a social API module 350. In other embodiments, the cart management module 250 may include different or additional modules.

The cart sharing module 310 provides interfaces for enabling users to select carts for sharing with one or more other users and to select shared carts (from the shared cart repository 340) for viewing and/or adding to an order. The customer client device 100 may present a "share" control element in an interface displaying the cart in the customer client device 100 that enables sharing of a cart created by the user. A cart may be shared in several ways. In one embodiment, a cart may be directly sent to another user in the form of a direct message. Here, the user may select a contact from a contact list and the cart sharing module 310 may generate a notification (e.g., a push notification, email, text, etc.) to the contact referencing the shared cart. In another embodiment, the cart may be shared publicly or semi-publicly (e.g., between social network connections) via social media. Here, the customer client device 100 may enable selection of a social media platform directly from the cart interface for sharing the cart. Upon selecting to share the content, the cart sharing module 310 may generate an embeddable link for sharing in a social media post on the selected platform. Alternatively, the cart sharing module 310 may directly access the social media platform via an application programming interface (API) and cause creation of a post associated with the user's linked account that includes the embeddable link. In an embodiment, a user may choose (e.g., via a preferences option) to automatically push carts to one or more social media platforms without necessarily expressly selecting to share each cart. In yet another embodiment, a reference to the cart may be stored to shared cart repository 340 and may be made publicly accessible to other users of the online concierge system 140 or to users having appropriate access permissions granted by the creator of the cart. Here, the shared cart may optionally be made searchable to enable other users to discover the cart via a search query or via automated recommendations discussed in further detail below.

Upon accessing a shared cart, the items in the cart may be automatically populated to the cart interface of the customer client device 100. The user may then edit the cart (e.g., using the cart editor module 330 described below), reshare the cart with others, and/or order the items in the cart without individually selecting each item.

In an embodiment, users may customize preferences associated with sharing of carts. For example, a user may choose to have all carts remain private. Another user may choose to make all carts publicly accessible to anyone, or only to a limited set of connected contacts (e.g., friends and family).

The cart sharing module 310 may enable users to subscribe to or follow shared carts associated with specific users or relating to specific categories of carts. When the user follows a cart, the user may receive notifications relating to new carts associated with the followed user or category. For example, users may follow a celebrity's cart to receive notifications of carts created by that celebrity through the online concierge system 140. In another example, a user may follow carts relating to a topic of interest such as "Austin Music Festivals." The user may then receive notifications associated with shared carts that have been tagged as being associated with this topic. Notifications associated with subscriptions may be received via push notifications, electronic messages, or via a news feed in the online concierge system 140. Such a news feed may chronologically show carts subscribed to by the user and may include links for the user to add a desired cart to their order.

The cart sharing module 310 may enable real-time following of a shared cart. Here, a user that selects to follow a shared cart may be granted access to the cart as it is being populated. The real-time population of a cart may be viewed via an interface of the customer client device 100, or via an external social media platform linked to the online concierge system 140.

In another example, the cart sharing module 310 may generate a shared cart based on items obtained in-person from a physical retail store. Here, the online concierge system 140 may be integrated with a point-of-sale (POS) system of the retailer to enable the online concierge system 140 to track items scanned by a user. The cart sharing module 310 may then generate a shared cart associated with the items and the user in a manner similar to carts populated through the customer client device 100.

The cart sharing module 310 may also enable access to carts in the shared cart repository 340 that may be generated by other users or by various other entities. For example, cart sharing module 310 may enable access to shared carts generated by staff of the online concierge system 140. Furthermore, retailers may generate shared carts associated with one or more retail locations. For example, a retailer may generate a cart of "Halloween treats" that includes items from their own retailer. In further embodiments, carts may be created by manufacturers of items. For example, a winemaker may generate and share a cart for a "wine and cheese night" that includes a selection of their wines and a selection of recommended cheese pairings.

In further embodiments, the cart sharing module 310 may automatically generate shared carts with automatically selected items. Here, a shared cart may be generated in association with a particular event (e.g., an upcoming holiday), a location, or user profile. In an embodiment, a machine learning approach may be used to automatically select items for a cart based on historical interactions. For example, the online concierge system 140 may learn which items are most commonly ordered around Thanksgiving and automatically generate a shared cart of recommended items associated with Thanksgiving. In another example, the cart sharing module 310 may learn items that are commonly purchased by users near Big Bend and automatically generate a cart with items associated with a Big Bend trip.

In further embodiments, the cart sharing module 310 may select items for an automatically generated shared cart based at least in part on promotional campaign bids from retailers or other sources of items (e.g., a manufacturer or wholesaler). Here, a promotion auction may enable sellers to bid on promotion opportunities that increase a likelihood of their product being included in automatically generated carts.

A shared cart may include a list of items for inclusion in the cart and may include various metadata identifying characteristics of the cart. The metadata may comprise, for example, a title of the cart and one or more tags representing an attribute of the cart (e.g., a theme of the cart, an occasion associated with the cart, a location associated with the cart, etc.). The title and the tags may be provided by the creator of the cart, or may be automatically generated based on metadata associated with items in the cart. Here, the cart sharing module 310 may apply one or more machine learning algorithms to classify the cart. For example, a cart including various cheese, crackers, and fruit may be automatically classified and tagged as a "cheese board." A cart with items generated associated with a camping trip such as a fire starter, bug spray, a flashlight, smores kit, etc. may be tagged with "camping."

The items in a shared cart may be referenced based on item identifiers or item categories that may be commonly used across different retailers or retail locations such that ordering of a shared cart may generally be agnostic to retailers selling similar products. For example, a shared cart created by one user based on items available at a local retailer may be shared with another customer in a completely different geographical location. The cart sharing module 310 may identify a retailer local to the second customer that sells the same or similar items and put those locally available items in the second customer's cart. In the case that the same items are not available at a retailer local to the customer accessing the shared cart, the cart sharing module 310 may substitute the items for similar ones or omit items from the shared cart. Thus, each shared cart may be tailored for the customer accessing the cart based on local availability information.

The cart recommendation module 320 generates recommended carts that may be tailored to individual users. In an embodiment, recommended carts may be presented in response to a search query that returns shared carts having titles or tags matching certain keywords. For example, a user may search for "Superbowl Party" and receive one or more recommended carts that are user-designated or automatically identified as being recommended for this type of event. In another embodiment, a list of recommended shared carts may be accessed that are not necessarily based on an explicit search query.

The recommended carts may furthermore be based on manually configured or automatically learned preferences of the user. For example, a user may be identified as a vegetarian based on a manual preference selection or based on an inference derived from the user's historical orders. In this case, the search query may automatically be further refined to prioritize shared carts that are more likely to match the user's preference (e.g., prioritizing carts with vegetarian foods).

The cart recommendation module 320 may also generate recommendations based in part on carts that the user is following or previously ordered. For example, a user that follows carts of a specific professional athlete may be more likely to be presented with a recommendation for a recent cart created by that professional athlete, or by related individuals. Additionally, the cart recommendation module 320 may generate recommendations based on social networking activity of the user. For example, if a user frequently follows posts from a celebrity chef on a social media platform, the cart recommendation module 320 may recommend a cart created by that celebrity chef. In another example, recommendations may be generated in association with a meal plan subscribed to by the customer.

In another embodiment, if the user grants appropriate access permissions, the cart recommendation module 320 may recommend a cart based at least in part on a current or future event associated with the customer. The future event may be derived from location information of the customer, a calendar entry in an electronic calendar associated with the customer, a current location of the customer associated with the future event, a list of upcoming holidays relevant to the customer, and a list of events derived from a public data source. For example, the cart recommendation module 320 may identify an upcoming event on the user's calendar (e.g., road trip to Montreal) and automatically identify carts with titles, tags, or other metadata suggesting the cart will be a good match for the event.

The cart recommendation module 320 may recommend a cart based on a subset of items that a user has already selected. For example, if the user adds items such as baby bottles, diapers, and baby food, the cart recommendation module 320 may infer that the user is shopping for baby care items and may recommend a full cart of items consistent with that inference.

The cart recommendation module 320 may furthermore generate cart recommendations based in part on promotional bids submitted by manufacturers, retailers, or other sellers of products. Here, a promotion auction may be implemented to auction promotion opportunities that may increase the likelihood of the cart recommendation module 320 recommending a certain shared cart (based on the cart itself or items within the cart).

In an embodiment, users may provide one or more ratings for a shared cart (e.g., a rating on a scale of 1 to 5, a thumbs up/thumbs down, a "like", or other rating). The cart recommendation module 320 may generate the recommended carts and/or rank a list of recommended carts returned from a search query based at least in part on ratings.

The cart recommendation module 320 may be based at least in part on a machine learning model that indexes shared carts in the shared cart repository 340 and classifies shared carts using a machine learning approach to assign relevance scores for a particular customer, ranked based on a likelihood of interest to the customer. Here, carts may be characterized as feature vectors generated based on the items in the cart and metadata associated with the cart and/or items that may be inputted into a machine learning module together with a feature vector representing customer characteristics, historical interactions, external data (such as location, weather, trends, or other elements) or other signals described herein. The machine learning model may then generate inferred scores for available carts based on user features and rank the carts based on likelihood of interest or other decision metric. The cart recommendation module 320 may present tailored recommendations based on the ranking.

In an embodiment, the cart recommendation module 320 may obtain feedback on recommendations and then learns which recommendations are most likely to be followed. For example, the cart recommendation module 320 may detect when a user accepts a recommended cart, declines a recommended cart, and/or edits a recommended cart and provide these events as feedback to a machine learning algorithm to improve future recommendations.

The cart editor module 330 enables editing of a cart that the user has created or that has been shared with the user. The cart editor module 330 may include a user interface to enable manual editing of a cart (e.g., to add or remove items before ordering). The cart editor module 330 may furthermore automatically edit shared carts in accordance with user-configured preferences or inferences about the user. For example, the cart editor module 330 may automatically edit a shared cart selected by a user to remove bananas if the user either expressly indicates a general preference to remove bananas, or by inferring that the user prefers not to include bananas (e.g., based on a machine learning model that learns from historical observations of the customer removing bananas from a shared cart).

The shared cart repository 340 stores a set of curated carts that are available for sharing. For example, the shared cart repository 340 may comprise a database that includes, for each shared cart, an identifier for uniquely referencing the cart, a set of items associated with the cart, a title for the cart, tags associated with the cart, a creator of the cart, permissions associated with accessing the cart, ratings associated with the cart, or other related information. The items associated with a cart may be stored as references to item identifiers (e.g., an SKU or item category) that may be commonly used across different retailers such that a shared cart may be agnostic to different retailers or retailer locations that sell similar goods.

The social API module 350 comprises one or more APIs for interfacing between the online concierge system 140 and one or more social media platforms. The social API module 350 may implement functions such as obtaining social networking data from a social media platform relevant to generating shared cart recommendations, generating posts for the social media platform associated with sharing carts, or other functions relating to the integration of the online concierge system 140 with various social media platforms.

Figure 4:
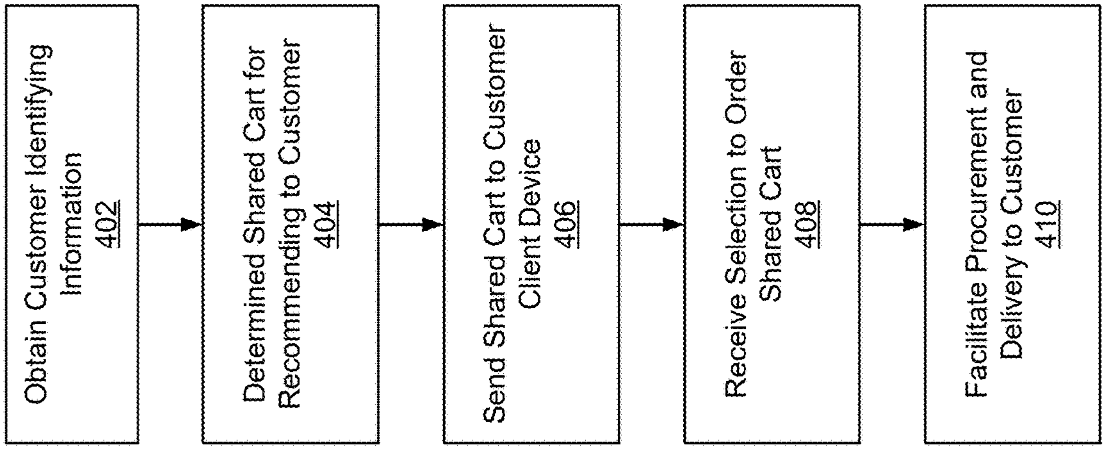
FIG. 4 is an example embodiment of a process for facilitating ordering in an online concierge system based on a shared cart recommendation.
Figure 5:
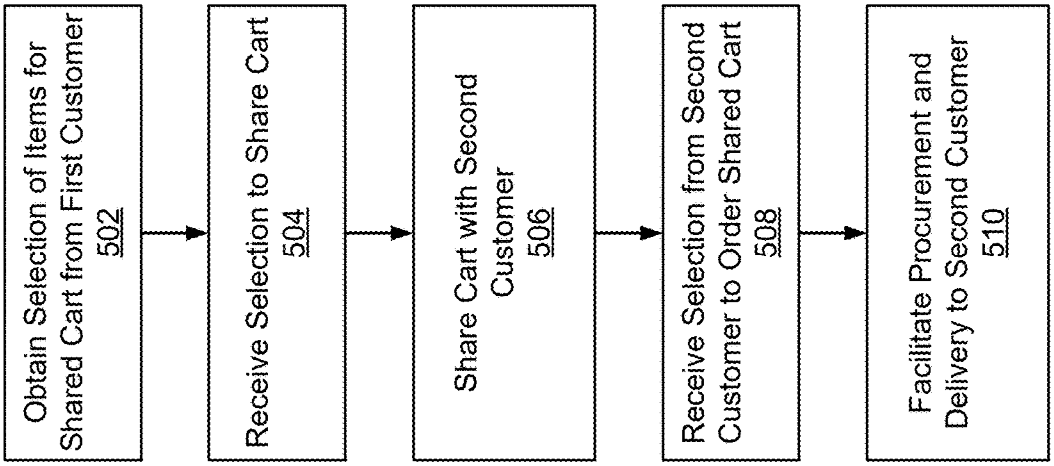
FIG. 5 is an example embodiment of a process for facilitating sharing of a shared cart created by a customer of the online concierge system.

FIGS. 4-5 are flowcharts for methods of managing shared carts in an online concierge system in accordance with some embodiments. Alternative embodiments may include more, fewer, or different steps from those illustrated in FIGS. 4-5 and the steps may be performed in a different order from that illustrated in FIGS. 4-5. These steps may be performed by an online concierge system (e.g., online concierge system 140). Additionally, each of these steps may be performed automatically by the online concierge system without human intervention.

FIG. 4 is an example embodiment of a process for facilitating ordering in an online concierge system 140 based on a shared cart recommendation. The online concierge system 140 obtains 402 customer identifying information for a customer of the online concierge system. The customer identifying information may include, for example, customer profile information, information in a customer's electronic calendar, historical interactions of the customer with the online concierge system, interactions of the customer associated with third-party social media platforms or web sites, social networking connections of the customer, or other information relevant to recommending shared carts to the customer. The online concierge system 140 determines 404, based on the customer identifying information, a shared cart for recommending to the customer. Here, the shared cart may be recommended based on an express query from the customer for carts associated with specified keywords, based on carts targeted to the customer by other users of the online concierge system 140, or based on inferences generated by the online concierge system 140 about items that will be of interest to the customer. Inferences may be generated based on one or more machine learning models. The online concierge system 140 sends 406 the shared cart to the customer client device 100 for review by the customer. Here, the customer may decline to order the cart, edit the cart, or select to order the cart. If the online concierge system 140 receives 408 a selection to order the shared cart, the online concierge system 140 facilitates 410 procurement and delivery of the items in the shared cart to the customer (e.g., by assigning the order to a picker).

FIG. 5 is an example embodiment of a process for facilitating sharing of a shared cart created by a customer of the online concierge system 140. The online concierge system 140 obtains 502 a selection of items for including in the shared cart from a first customer. The online concierge system 140 receives 504 a selection from the customer to share the cart and shares 506 the cart with at least a second customer. Here, the customer may specifically target another user to share the cart with, the cart may be shared to a select set of users (e.g., subscribers of the customer), or the cart may be shared publicly so that anyone may access it. Carts may be shared via direct notifications to other customers, via social media posts, or via an embeddable link that references the shared cart in the shared cart repository 340. The online concierge system 140 receives 508 a selection from a second customer (that receives the shared cart) to place an order using the shared cart. The online concierge system 140 then facilitates 510 procurement and delivery of the items in the shared cart to the customer (e.g., by assigning the order to a picker).

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and they may be used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

receiving, by an online system from a first client device associated with a first user, a selection of one or more items available at a first item site for adding to a shared item list created by the first user;

generating an item representation for each of the one or more items of the received selection, wherein an item representation represents a set of items available at different locations;

generating the shared item list based on the generated item representations;

obtaining, by the online system, user data for a second user of the online system;

determining whether to transmit the shared item list to a second client device associated with the second user of the online system by applying a machine learning model to the user data for the second user;

responsive to determining to transmit the shared item list to the second client device, transmitting the shared item list to the second client device for presentation on a display of the second client device of the second user, wherein transmitting the shared item list comprises:

receiving location data from the second client device describing a location of the second client device, wherein the location data comprises data captured by a location sensor of the second client device;

selecting the second item site based on the location data from the second client device and a location of the second item site;

identifying one or more items available at the second item site that correspond to the generated item representations;

generating a recommendation of the shared item list based on the identified one or more items; and transmitting user interface instructions to the second client device, wherein the user interface instructions cause the second client device to display at least one user interface element to place an order for the identified items corresponding to the item representations in the shared item list;

receiving, from the second client device, a selection of the at least one user interface element;

responsive to receiving the selection, generating an order that includes the identified items; and sending, to a picker client device of the picker, instructions for delivery of the one or more items in the order to the second user.

2. The method of claim 1, wherein determining whether to transmit the shared item list to the second user comprises:

receiving a search query from the second user;

comparing the search query to metadata associated with a set of shared item lists in a shared item list repository; and selecting the shared item list for transmitting to the second user based on the comparison.

3. The method of claim 1, wherein determining whether to transmit the shared item list to the second user comprises:

receiving, from the second user, a request to subscribe to item lists from the first user; and selecting the shared item list for transmitting to the second user from a set of new item lists created by the first user subscribed to by the second user.

4. The method of claim 1, wherein determining whether to transmit the shared item list to the second user comprises:

obtaining a set of characteristics associated with the second user; and applying the machine learning model to the set of characteristics to identify the shared item list for transmitting to the second user, wherein the machine learning model is trained based on historical interactions of users with item lists.

5. The method of claim 1, wherein determining whether to transmit the shared item list to the second user comprises:

predicting a likelihood of a future event associated with the second user; and selecting the shared item list for transmitting to the second user based on the predicted likelihood of the future event.

6. The method of claim 5, wherein predicting the likelihood of the future event comprises:

predicting the likelihood of the future event from at least one of a calendar entry in an electronic calendar associated with the second user, a current location of the second user, a list of upcoming holidays relevant to the second user, and a list of events derived from a public data source; and selecting the shared item list for recommending to the second user based on predicted likelihood of the future event.

7. The method of claim 1, wherein determining whether to transmit the shared item list to the second user comprises:

selecting the shared item list from a shared item list repository that stores item lists created by other users of the online system.

8. The method of claim 1, wherein determining whether to transmit the shared item list to the second user comprises:

receiving the shared item list from another user of the online system that recommends the shared item list to the second user.

9. The method of claim 1, wherein determining whether to transmit the shared item list to the second user comprises:

obtaining a set of characteristics associated with the second user;

applying a machine learning model to the set of characteristics to identify a set of items for including in a shared item list for recommending to the second user, wherein the machine learning model is trained based on historical interactions of users with the online system; and automatically generating the shared item list based on the set of items identified from the machine learning model.

10. The method of claim 1, wherein transmitting the shared item list to the second client device comprises:

sending a notification to the second client device with a link for accessing the shared item list.

11. A non-transitory computer-readable medium storing instructions that, when executed by a computing system, cause the computing system to perform operations comprising:

receiving, by an online system from a first client device associated with a first user, a selection of one or more items available at a first item site for adding to a shared item list created by the first user;

generating an item representation for each of the one or more items of the received selection, wherein an item representation represents a set of items available at different locations;

generating the shared item list based on the generated item representations;

obtaining, by the online system, user data for a second user of the online system;

determining whether to transmit the shared item list to a second client device associated with the second user of the online system by applying a machine learning model to the user data for the second user;

responsive to determining to transmit the shared item list to the second client device, transmitting the shared item list to the second client device for presentation on a display of the second client device of the second user, wherein transmitting the shared item list comprises:

receiving location data from the second client device describing a location of the second client device, wherein the location data comprises data captured by a location sensor of the second client device;

selecting the second item site based on the location data from the second client device and a location of the second item site;

identifying one or more items available at the second item site that correspond to the generated item representations;

generating a recommendation of the shared item list based on the identified one or more items; and transmitting user interface instructions to the second client device, wherein the user interface instructions cause the second client device to display at least one user interface element to place an order for the identified items corresponding to the item representations in the shared item list;

receiving, from the second client device, a selection of the at least one user interface element;

responsive to receiving the selection, generating an order that includes the identified items; and sending, to a picker client device of the picker, instructions for delivery of the one or more items in the order to the second user.

12. The computer-readable medium of claim 11, wherein determining whether to transmit the shared item list to the second user comprises:

receiving a search query from the second user;

comparing the search query to metadata associated with a set of shared item lists in a shared item list repository; and selecting the shared item list for transmitting to the second user based on the comparison.

13. The computer-readable medium of claim 11, wherein determining whether to transmit the shared item list to the second user comprises:

receiving, from the second user, a request to subscribe to item lists from the first user; and selecting the shared item list for transmitting to the second user from a set of new item lists created by the first user subscribed to by the second user.

14. The computer-readable medium of claim 11, wherein determining whether to transmit the shared item list to the second user comprises:

obtaining a set of characteristics associated with the second user; and applying the machine learning model to the set of characteristics to identify the shared item list for transmitting to the second user, wherein the machine learning model is trained based on historical interactions of users with item lists.

15. The computer-readable medium of claim 11, wherein determining whether to transmit the shared item list to the second user comprises:

predicting a likelihood of a future event associated with the second user; and selecting the shared item list for transmitting to the second user based on the predicted likelihood of the future event.

16. The computer-readable medium of claim 15, wherein predicting the likelihood of the future event comprises:

predicting the likelihood of the future event from at least one of a calendar entry in an electronic calendar associated with the second user, a current location of the second user, a list of upcoming holidays relevant to the second user, and a list of events derived from a public data source; and selecting the shared item list for recommending to the second user based on predicted likelihood of the future event.

17. The computer-readable medium of claim 11, wherein determining whether to transmit the shared item list to the second user comprises:

selecting the shared item list from a shared item list repository that stores item lists created by other users of the online system.

18. The computer-readable medium of claim 11, wherein determining whether to transmit the shared item list to the second user comprises:

receiving the shared item list from another user of the online system that recommends the shared item list to the second user.

19. The computer-readable medium of claim 11, wherein determining whether to transmit the shared item list to the second user comprises:

obtaining a set of characteristics associated with the second user;

applying a machine learning model to the set of characteristics to identify a set of items for including in a shared item list for recommending to the second user, wherein the machine learning model is trained based on historical interactions of users with the online system; and automatically generating the shared item list based on the set of items identified from the machine learning model.

20. The computer-readable medium of claim 11, wherein transmitting the shared item list to the second client device comprises:

sending a notification to the second client device with a link for accessing the shared item list.

* * * * *